March 22, 1966     A. KATCHMAN     3,242,401
ELECTRICAL CAPACITOR AND DIELECTRIC MATERIAL THEREFOR
Filed Nov. 18, 1963
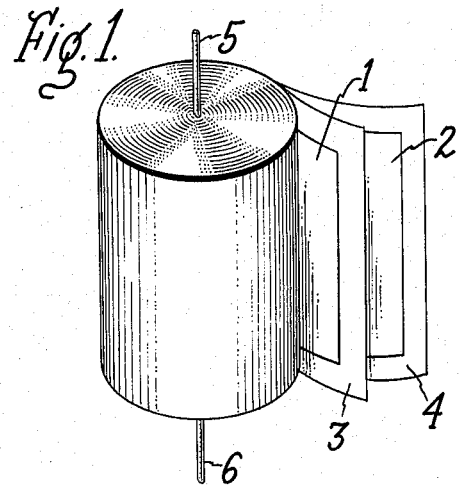
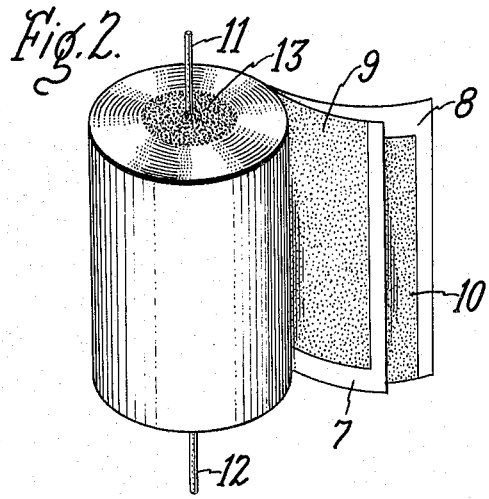
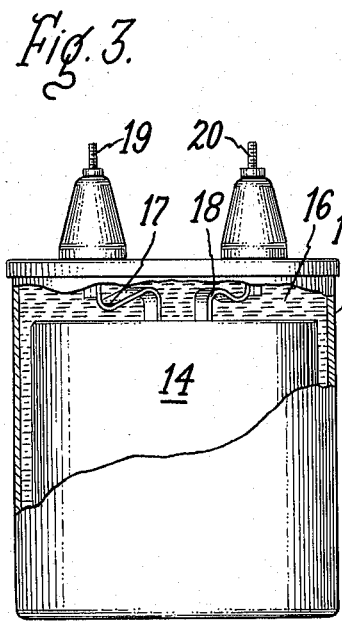
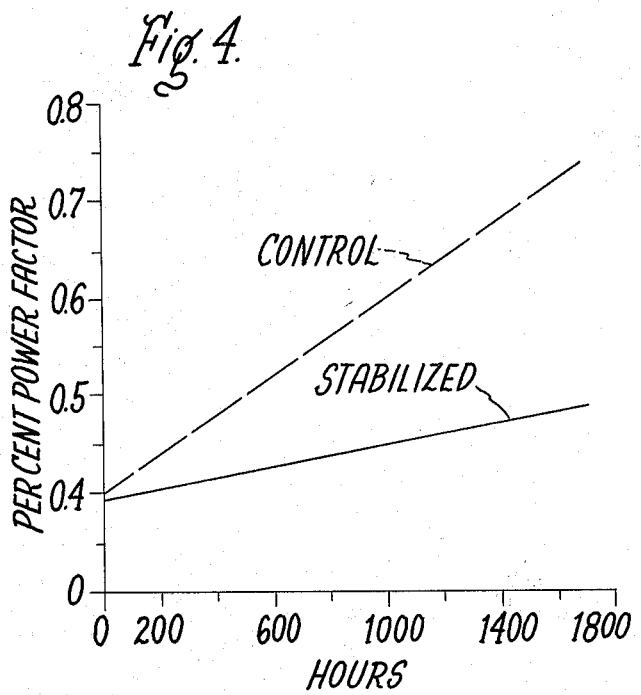
Inventor,
Arthur Katchman,
by Sidney Greenberg
His Attorney.

United States Patent Office  3,242,401
Patented Mar. 22, 1966

3,242,401
ELECTRICAL CAPACITOR AND DIELECTRIC
MATERIAL THEREFOR
Arthur Katchman, Glens Falls, N.Y., assignor to General
Electric Company, a corporation of New York
Filed Nov. 18, 1963, Ser. No. 324,399
7 Claims. (Cl. 317—259)

The present invention relates to electrical capacitors, and more particularly to an improved dielectric liquid for electrical capacitors.

Halogenated aromatic compounds, known as askarels in the industry, and specifically chlorinated diphenyl and related compounds, have been extensively used in the past as dielectric media in electrical apparatus such as electrical capacitors for cooling and insulating purposes, these compounds having the advantage over mineral oil dielectrics of being non-flammable and having higher dielectric constants. A difficulty which arises in the use of chlorinated aromatic compounds as dielectric media, however, is that electrical discharges or stress in the apparatus, or chemical hydrolytic attack, may cause decomposition products of the chlorinated compound to form, particularly hydrogen chloride, which adversely affect the properties of the dielectric and lead to degradation of the dielectric liquid and other insulating components in the apparatus and result in shortened life for capacitors. To overcome this problem, so-called scavenger or getter materials have been incorporated in the dielectric liquid for removing or neutralizing the effect of the hydrogen chloride and other decomposition products. However, the known scavenger materials heretofore employed for this purpose have had various drawbacks, such as reacting too slowly with the decomposition products, or adversely affecting the properties of the dielectric liquid, especially in terms of increasing power factor at elevated temperatures in the operation of the apparatus such as capacitors in which the dielectric liquid is incorporated.

It is an object of the invention to provide an improved dielectric composition of halogen aromatic type for electrical apparatus, especially electrical capacitors, having incorporated therein a novel scavenger material which avoids the above-mentioned disadvantages of prior used scavenger materials.

It is a particular object of the invention to provide electrical capacitors incorporating a halogen aromatic dielectric liquid having an improved scavenger material therein which provides stable power factor characteristics of the capacitor at high temperatures and over a prolonged period.

Other objects and advantages will become apparent from the following description and the appended claims.

With the above objects in view, the present invention relates in a preferred embodiment to an electrical capacitor comprising cooperating armatures and a dielectric liquid interposed between the armatures comprising a chlorinated diphenyl compound containing dissolved therein an epoxide scavenger comprising dipentene dioxide.

The invention will be better understood from the following description taken in conjunction with the accompanying drawing, in which:

FIGURE 1 illustrates an electrical capacitor to which the present invention is applicable;

FIGURE 2 illustrates a different embodiment of electrical capacitor to which the present invention may be applied;

FIGURE 3 illustrates an encased capacitor unit in which the invention may be embodied; and FIGURE 4 is a graphical showing of the characteristics of electrical capacitors incorporating the dielectric liquid composition of the present invention, as compared to other dielectric liquid compositions.

Referring now to the drawing, and particularly to FIGURE 1, there is shown a roll type capacitor comprising a pair of convolutely wound electrode foils 1 and 2 of suitable metal, e.g., aluminum, insulated from each other by separate sheets 3 and 4 of suitable dielectric material, such as kraft paper, or other porous impregnatable dielectric spacer material. Electrical contact to electrode foils 1 and 2 is made by terminal leads 5, 6 of electrically conducting material which are applied to the respective foil electrodes and project from opposite ends of the wound capacitor section.

In a different form of capacitor as shown in FIGURE 2, and in which the invention provides notable advantages, the wound capacitor section comprises a pair of convolutely wound dielectric films 7, 8 of suitable insulating materials such as cellulosic paper, plastic films, and the like, films 7, 8 having metallized coatings 9, 10 respectively thereon serving as the capacitor electrodes. The metallized electrode coatings may be composed of aluminum or any other suitable conducting material such as tin, silver, copper, lead, zinc, or non-metallic solid conductive material such as carbon, and may be applied by any metallizing or other suitable depositing techniques. A satisfactory metal coating may be produced, for example, by vacuum evaporation of the desired metal, or by sputtering, dipping, painting, chemical deposition, or the like. As shown, the margins of the opposite edges and the ends of dielectric films 7, 8 are left free of metal coating to avoid the risk of short-circuiting between the electrodes of opposite polarity. Terminals 11, 12 are electrically connected to the metallized coating edges exposed at opposite ends of the roll by a metal connection 13 produced by schooping, soldering, or other suitable process, as well known in the art.

As applied to capacitors of the metallized electrode type as shown in FIGURE 2, the invention is advantageous in making it practical to use metallized electrodes with their attendant benefits of self-clearing properties in combination with dielectric liquids of halogenated aromatic composition. The self-clearing effect is caused by momentary current increases taking place in the locality of defects of the dielectric spacer material which causes the metal electrode layer to burn away in that locality and restore the dielectric strength in that region. However, in the absence of an effective scavenging material such as that of the present invention, halogen-containing degradation products are generated when the electrode clearing occurs which are injurious to the thin electrode layer as well as to the dielectric liquid and the dielectric spacer material, and other components of the capacitor. By employing the present invention, there is thus made possible the use of metallized electrode capacitors which have small relative volume and the benefits of self-clearing, as described.

FIGURE 3 shows a capacitor assembly in which a wound capacitor section 14, such as the wound sections shown in FIGURES 1 and 2, is enclosed in a casing 15 containing a dielectric liquid 16 impregnating the rolled capacitor section. Dielectric liquid 16 is of halogenated aromatic composition and has a scavenger material incorporated therein of a composition as more fully described below. Tap straps 17, 18 connected within the capacitor section to electrodes of different polarity are respectively connected to external terminals 19, 20 suitably mounted on the cover of the casing.

During operation of the capacitor, decomposition of the aromatic dielectric liquid contained therein may occur when the dielectric liquid is subjected for long periods to voltage stress or to elevated temperatures, or to the action of reactive chemical agents.

In accordance with the invention, halogenated aromatic dielectric liquid 16 has incorporated therein an epoxide compound comprising dipentene dioxide having the following structural formula:

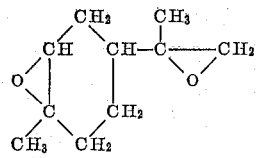

A commercially available epoxide compound of this composition is known as Epoxide 269, obtainable from Union Carbide Chemicals Company. This material is a liquid at ordinary temperatures and has a molecular weight of about 168 and a boiling point of 242° C. at 760 mm. Hg pressure.

It has been found in accordance with the invention that the dipentene dioxide not only provides marked improvement in protecting the electrical capacitor from the effects of decomposition products of the halogenated aromatic dielectric compound, but of particular significance is the fact that its use resulted in unexpected improvement of the high temperature power factor of the capacitor, as well as stabilization of the high temperature power factor.

In tests made on initial power factor characteristics of capacitors incorporating the dielectric liquid composition of the invention, capacitors were constructed of wound sections of aluminum foil electrodes separated by two sheets of .4 mil paper and impregnated with a dielectric liquid composed of trichlorodiphenyl containing dipentene dioxide in small amounts as shown in the table below. The data obtained when such capacitors and a control capacitor in which no scavenger was used were subjected to 300 volts A.C. at a temperature of 100° C. is shown in the table below:

TABLE I

| Dielectric composition: | 100° C. power factor, percent |
|---|---|
| Control—Trichlordiphenyl | .376 |
| Trichlordiphenyl+0.4% dipentene dioxide | .357 |
| Trichlordiphenyl+1.1% dipentene dioxide | .367 |

As will be seen from the above data, substantial improvements in power factor characteristics are obtained by the addition to the dielectric liquid of small amounts of the dipentene dioxide scavenger employed in accordance with the present invention.

Comparative life tests were conducted on two groups of capacitors of the same design and construction of which six units were controls containing exclusively trichlorodiphenyl while the second group comprising seven units contained 0.4% by weight of Epoxide 269 in trichlorodiphenyl. The capacitors, rated 3.83 μf. and 285 volts A.C., were subjected to life test conditions of 85° C. and a voltage of 660 volts A.C. In this test it was found that 50% of the control group failed under 1100 hours, whereas none of the capacitors stabilized in accordance with the invention failed after 1600 hours. The results of measurements made on high temperature power factor at 100° C. and 125° C. on both sets of units described above, initially and during the course of life testing, are listed below:

TABLE II

*Percent power factor*

| Time (Hrs.) | Control | | Stabilized | |
|---|---|---|---|---|
| | 100° C. | 125° C. | 100° C. | 125° C. |
| Initial | .371 | .404 | .357 | .401 |
| 270 | .365 | .455 | .362 | .429 |
| 523 | .389 | .564 | .364 | .429 |
| 1,076 | .394 | .612 | .377 | .452 |
| 1,596 | .404 | .714 | .381 | .485 |

FIGURE 4 is a graphical illustration of the foregoing data obtained at 125° C., and in the graph the percent power factor is plotted against the life test period in hours. As will be evident from the graph, the curve representing the control units rises at a much greater rate over the period of the life tests than that representing the dipentene dioxide stabilized units of the invention, which are remarkably stable even under the elevated temperature conditions.

It is well known to those versed in the art that the increase in power factor obtained in the control units at 100° C. and more prominently at 125° C. will lead to a condition of thermal runaway resulting in failure of these units. Thus, the effect of the epoxide employed in the invention in suppressing the increase in power factor will provide longer life for capacitors.

It has been found, further, that capacitors incorporating the dipentene dioxide scavenger material exhibit better power factor characteristics at elevated temperature than those with other epoxide scavengers. Thus, comparative tests at 100° C. made on two groups of identical wound type capacitors, wherein one group contained .5% of dipentene dioxide whereas the other group contained .3% of 1-epoxy-ethyl-3,4 epoxycyclohexane, showed that the former units had an average percent power factor about 10% less than that of the latter units. This result was further unexpected in that, typically, higher power factors are produced by higher concentrations of the epoxide scavengers, as seen from the data in the Table I above.

Other tests have also indicated that of the two epoxide compounds mentioned in the preceding paragraph, the dipentene dioxide resulted in much lower and more stable power factor in life tests conducted at 125° C.

In general, the epoxide scavenger may be used in a range of about .01% to 5% by weight, with a preferred range for optimum purposes being about .1 to 1% by weight. The chlorinated aromatic compounds in which the described epoxide scavenger may be used may be of various compositions, as for example, the trichlordiphenyl previously mentioned, pentachlordiphenyl, hexachlordiphenyl, trichlorbenzene, tetrachlorbenzene, and mixtures thereof.

In addition to the above advantages, the dipentene dioxide exhibits relatively high speed of reaction with the decomposition products, as compared to known scavenger compounds, including epoxides such as phenoxypropylene oxide alone or in combination with an accelerating catalyst such as an amine.

By virtue of the improved power factor characteristics of capacitors constructed in accordance with the invention, such capacitors have considerably improved life especially under high temperature conditions, and such desirable advantages are obtained without sacrifice in the other electrical properties such as capacitance, which remains stable over wide temperature ranges.

While the present invention has been described in connection with particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Electrical apparatus comprising, in combination, a container, an electrical device in said container, and dielectric material in said container comprising a chlorinated aromatic dielectric fluid containing .01 to about 5% by weight of dipentene dioxide.

2. An electrical capacitor comprising, in combination, cooperating armatures and a dielectric liquid interposed between said armatures comprising a chlorinated aromatic compound containing dissolved therein .01 to about 5% by weight as a scavenger of dipentene dioxide.

3. An electrical capacitor comprising, in combination, a pair of electrodes separated by cellulosic dielectric material, and a dielectric liquid impregnating said dielectric material comprising a chlorinated aromatic compound containing dissolved therein as a scavenger .01 to about 5% by weight of dipentene dioxide.

4. An electrical capacitor comprising, in combination, a pair of electrodes separated by films of dielectric material, at least one of said electrodes being in the form of a thin metallized coating on the dielectric material, and a dielectric liquid impregnating said metallized dielectric material comprising a chlorinated aromatic compound containing dissolved therein as a scavenger .01 to about 5% by weight of dipentene dioxide.

5. An electrical capacitor comprising, in combination, a pair of wound electrodes of metallic foil, said metallic foil electrodes being separated by dielectric spacer material, and a dielectric liquid impregnating said dielectric spacer material comprising a chlorinated aromatic compound containing dissolved therein as a scavenger .01 to 5% by weight of dipentene dioxide.

6. An electrical capacitor comprising, in combination, cooperating armatures and a dielectric liquid interposed between said armatures comprising trichlordiphenyl containing dissolved therein as a scavenger .01 to 5% by weight of dipentene dioxide.

7. A dielectric composition comprising a chlorinated aromatic dielectric liquid containing about .1–5% by weight of dipentene dioxide.

References Cited by the Examiner

UNITED STATES PATENTS

| | | | |
|---|---|---|---|
| 2,582,200 | 1/1952 | Hartzog | 317—259 X |
| 2,840,627 | 6/1958 | Lewis | 252—65 X |

JOHN F. BURNS, *Primary Examiner.*